United States Patent [19]

Sortwell, III

[11] 4,317,840

[45] Mar. 2, 1982

[54] ENROBINC COMPOSITION FOR FROZEN COMESTIBLES

[75] Inventor: Daniel R. Sortwell, III, Mamaroneck, N.Y.

[73] Assignee: SCM Corporation, New York, N.Y.

[21] Appl. No.: 197,957

[22] Filed: Oct. 17, 1980

[51] Int. Cl.³ .............................................. A23D 5/00
[52] U.S. Cl. .................................. 426/100; 426/589; 426/606; 426/607; 260/409; 426/613; 426/307
[58] Field of Search ................ 426/99, 100, 606, 607, 426/613, 307, 589; 260/409

[56] References Cited

U.S. PATENT DOCUMENTS

| | | | |
|---|---|---|---|
| 2,972,541 | 2/1961 | Cochran et al. | 426/606 |
| 3,949,105 | 4/1976 | Wieske et al. | 426/607 |
| 4,045,588 | 8/1977 | Wieske | 426/607 |
| 4,183,971 | 1/1980 | Minowa et al. | 426/607 |
| 4,199,606 | 4/1980 | Sortwell | 426/99 |
| 4,234,618 | 11/1980 | Jasko et al. | 426/607 |

Primary Examiner—Jeanette M. Hunter
Attorney, Agent, or Firm—Robert A. Sturges; Merton H. Douthitt

[57] ABSTRACT

A sauce coating base for liquid phase application to a foreign comestible comprising a blend of a nonrandom triglyceride hard butter consisting essentially of $C_{16}$ and $C_{18}$ acids having by weight 25-55% saturated fatty acids, 30-50% transmonoethanoic acids and 15-40% cis-monoethanoic acids and a hydrogenated edible vegetable oil hving an iodine value of about 97-102 and characterized in that coatings made therefrom resist cracking at frozen food temperatures and resist smearing off at room temperature. Sauces prepared from these bases are organoleptically acceptable when heated to serving temperatures. The sauces can be applied in a conventional batter applicator.

11 Claims, 1 Drawing Figure

ENROBINC COMPOSITION FOR FROZEN COMESTIBLES

The present invention relates, as indicated, to a composition for application to frozen comestibles, and more particularly, to a sauce composition for liquid phase application to frozen foods, e.g., fish.

BACKGROUND OF THE INVENTION AND PRIOR ART

At the present time, the frozen foods industry manufactures and sells frozen vegetable/sauce combinations, frozen meat/sauce combinations, and frozen fish/sauce combinations in single serving units for both restaurant and in-home preparation and use. These products are typically packaged in trays formed from aluminum, plastic, or paper board, or packaged in plastic laminate pouches. The methods used to fill the tray or pouch with the substrate/sauce combination are relatively slow and are only capable of filling and sealing a certain number of containers per minute regardless of the size of the container. In other words, the smaller the container, the slower the production rate in terms of pounds per hour. The cost of a frozen substrate/sauce combination singly packaged in single serving units is relatively high because of the manufacturing method used. The line speed for production is limited by the number of containers the closing machine can close per minute. The present enrobing invention is not so limited.

Portion control provides a marketing advantage. Using substrate/sauce combinations in units of single serving size which do not require individual packages is definitely an advantage to either the restaurant operator or the consumer for in-home use since waste and overcooking due to extended holding at high temperatures are eliminated. Packaging in convenient bulk sizes saves packaging costs.

Food service operators can limit waste by preparing only as much product as they need. And, with the "bulk" pack, there are no extra containers to dispose of. Consumers can cater to individual tastes with no leftovers, and the single-serving size is ideal for today's one-and two-person households.

U.S. Pat. No. 4,199,603 assigned to SCM Corporation, discloses frozen food products such as fish, poultry and vegetable frozen products suitable for microwave or oven cooking, which when cooked resemble in taste, texture and appearance fat-fried products. These frozen food products are prepaed by coating frozen portions of the comestibles with an edible oil containing a moisture absorbing substance such as pregelatinized starch, and then applying to the coated portions finely divided hygroscopic, crisp particulate such as toasted bakery, cereal or carbohydrate particulate capable on cooking of giving the appearance of a fat-fried product. According to this patent, the dilatometric profile of the edible oil is critical and is such that the oil is fluid at room temperature but has a plastic consistency at the temperature of the frozen portions.

U.S. Pat. No. 2,972,541 discloses certain hard butters prepared from nonlauric oils such as cottonseed, soybean and other vegetable oils, or from lard and other animal oils and/or fats, or mixtures of vegetable oils, of animal oils, or of animal and vegetable oils. These materials are characterized by having relatively good hardset at room temperature and a sharp melting point at human body temperatures. Hard butter compositions of the type described in U.S. Pat. No. 2,972,541 are employed in carrying out the present invention.

The present invention is in a formulation and process used to manufacture frozen substrate/sauce combinations in single serving units for bulk packaging at relatively high production speeds. The major advantage of the present invention is a substantial reduction in the processing cost of a frozen substrate/sauce combination marketed in single package single serving units. The invention comprises enrobing frozen food portions with a heated sauce coating which is characterized by rapid hardening upon contact with the frozen food without cracking and falling off. Still further, these compositions are characterized in that they do not smear off when transferred by hand from the storage container to the container used to heat the product prior to serving. Finally, these compositions are characterized by being organoleptically acceptable when heated to serving temperatures of from 120° to 150° F. These requirements are met by utilizing a unique fat system as a base component of the sauce coating.

BRIEF STATEMENT OF THE INVENTION

Briefly stated, therefore, the present invention is in a sauce coating base for liquid phase application to a frozen comestible, a coating formed therefrom being characterized by resistance to cracking at frozen food temperatures. The base comprises from about 35 to 45 parts by weight of a nonrandom triglyceride hard butter consisting essentially of fatty acids of 16 and 18 carbons distributed in the following ranges:

|  | Percent |
| --- | --- |
| Saturated fatty acids | 25–55 |
| Trans-monoethanoic acids | 30–50 |
| Cis-monoethanoic acids | 15–40, and | from 55–65 parts by weight of a partially hydrogenated edible vegetable oil having an iodine value of about 97 to 102.

Compositions as described above additionally have the properties of resistance to smearing off when handled in transferring from the package to the container in which the food is to be heated prior to serving, and being organoleptically acceptable when heated to a serving temperature.

Sauces prepared utilizing the bases of the present invention quickly solidify upon contact with the frozen comestibles. Such sauces may be applied by conventional apparatus. The temperature of the comestible at the time of application is approximately 0° to about 10° F. The temperature of the sauce at the time of application should be in the range of from 95° F. to 110° F., the lower temperature favoring thicker coatings.

BRIEF DESCRIPTION OF THE DRAWING

The annexed drawing shows in schematic and diagrammatic form an apparatus similar to a confectionary enrober unit and useful in applying the compositions of the present invention to frozen comestibles.

DETAILED DESCRIPTION OF THE PRESENT INVENTION AND SPECIFIC EXAMPLES

Figure 1:
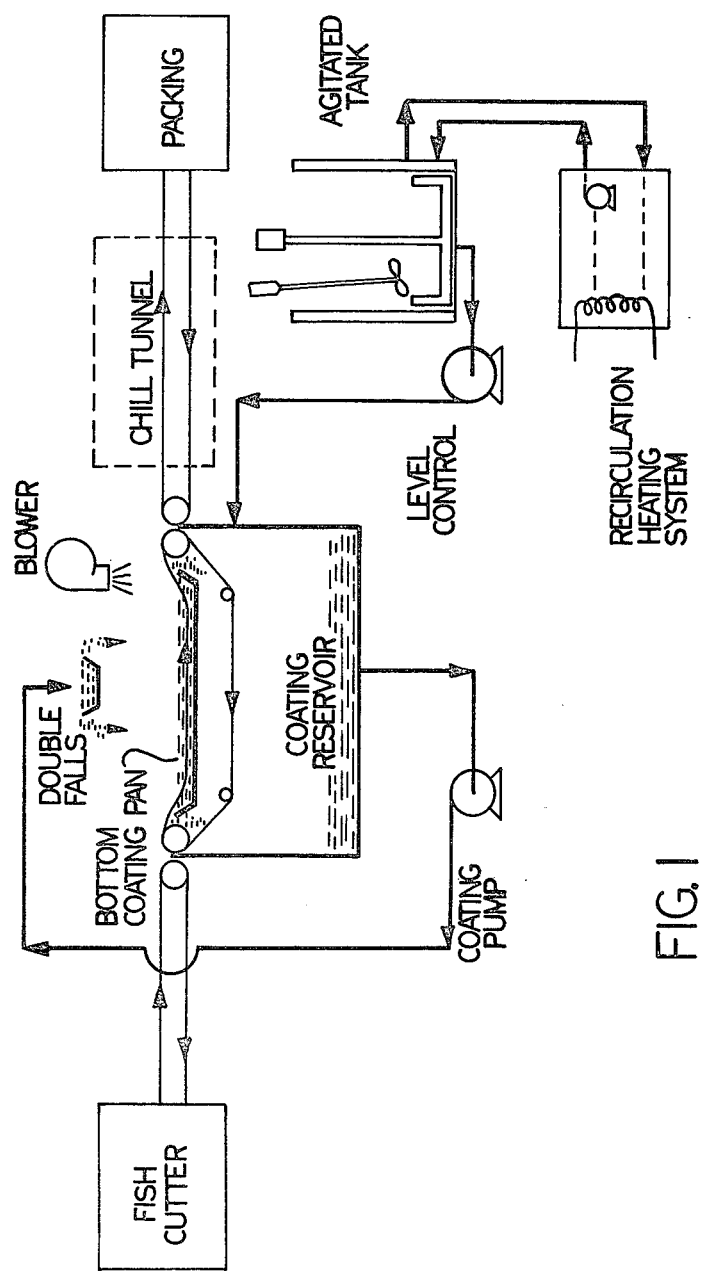

The sauce compositions of the present invention include a fat base, the composition of which is quite critical and largely determinative of the physical properties of the final product. The sauce coating base compositions of the present invention are a blend of two principal types of material. The first of these is a hard butter material of the type described in U.S. Pat. No. 2,972,541 assigned to the assignee of the present invention, the disclosure of which patent is incorporated herein in its entirety by reference thereto. The second principal ingredient is a partially hydrogenated edible vegetable oil having an iodine value of from about 97 to about 102. These partially hydrogenated vegetable oils are described in detail in U.S. Pat. No. 4,199,603, also assigned to the assignee of the present invention, the disclosure of which patent is also incorporated in its entirety herein by reference thereto.

It has been found that when these materials are heat blended in the range of from about 35 to .45 parts by weight of the hard butter material, and from about 55 to 65 parts by weight of the partially hydrogenated edible vegetable oil, there is provided a sauce coating base composition which enables the achievement of the following desirable properties:

(a) The coating hardens rapidly on the surface of frozen comestible portions.
(b) The coating handles easily and resists smearing after application.
(c) Once frozen, the coating resists cracking and does not become brittle. Unless the temperature is abnormally low, e.g., −40° F. small hairline cracks may appear occasionally if the product has been handled roughly.
(d) The coating resists peeling when the frozen product is held at room temperature.
(e) The mouthfeel of the melted coating is acceptable, i.e., in terms of greasiness or waxiness.

To illustrate the critical nature of the respective proportions of the hydrogenated vegetable oil and the hard butter components, the following comparative study has been made. In this study, a commercial product identified as Kaomel was utilized as the hard butter component. Kaomel is described in the aforesaid U.S. Pat. No. 2,972,541. This material has a Wiley Melting Point of 97°–101° F. The SFI (Solid Fats Index) is as follows:

| Temperature °F. | | Approximate Percent Solids |
| --- | --- | --- |
| 50 | = | 69–72 |
| 70 | = | 59–63 |
| 80 | = | 52–55 |
| 92 | = | 21–23 |
| 100 | = | 3–5 |
| 110 | = | 0 |

The hard butter component is desirably a nonrandom triglyceride hard butter consisting essentially of fatty acids of 16 and 18 carbon atoms distributed in the following ranges: saturated fatty acids 25-55% by weight, transmonoethanoic acids, 30-50%; and cis-monoethanoic acids, 15-40%.

The partially hydrogenated edible vegetable oil used in this study was a commercially available partially hydrogenated soybean oil identified as Dress-All, containing about 2-5% stearine and described in U.S. Pat. No. 4,199,603 above referred to. This oil has a Wiley Melting Point of about 98-107 and a dilatometric profile as follows:

| °F. | | Approx. Solid Fat Index |
| --- | --- | --- |
| 92 | = | 2 |
| 104 | = | 0 |

The material has an iodine value of about 97–102 and a viscosity at room temperature (about 70° F.) as measured on a Brookfield viscometer at 70° F. using a number 3 spindle at 60 RPM of about 1200 CPS maximum. The Solid Fat Index of Dress-All at 0° F. to 15° F. is estimated to be in the range of about 30-50. The following fat blends were formulated, heated to 120° F., and used to coat frozen fish portions at 0°–10° F. by dipping the fish portions in the fat blend:

(1) Durkee Kaomel—100%
(2) Durkee Kaomel—95% Propylene Glycol—5%
(3) Durkee Kaomel—50% Durkee Dress-All Base Oil—50%
(4) Durkee Kaomel—30% Durkee Dress-All Base Oil—70%
(5) Durkee Kaomel—40% Durkee Dress-All Base Oil—60%

When these formulations were tested as indicated above, formulations 1-3 cracked when hardening on the surface of the frozen fish. Formulation No. 4 did not crack and formed a continuous coating on the frozen fish, but was smearable and melted off when handled by hand. Formulation No. 5 did not crack and did not melt when handled by hand and was therefore the blend used to formulate the sauce coating described below. The solid fats index of the Formulation No. 5 compared with butter fat is as follows:

| Temperature °F. | | Solid Fat Percent Formulation (5) | Solid Fat Percent Butter Fat |
| --- | --- | --- | --- |
| 70° F. | = | 21.7 | 14 |
| 80° F. | = | 16.9 | 10 |
| 92° F. | = | 6.9 | 3 |
| 100° F. | = | 3.1 | 3 |
| 110° F. | = | 0 | 0 |

Based on the SFI information, the mouthfeel of the 40/60 Kaomel/Dress-All blend is substantially the same as that of butter fat at serving temperatures which are in the range from 100° to 120° F.

FIG. 1 of the drawing shows what is essentially a commercially available double fall batter applicator apparatus. The apparatus, modified slightly, to provide a heated holding and mixing vessel may be used to enrobe frozen fish or other frozen comestible portions with a sauce coating at high production speeds. The end product is a fish/sauce combination which is useful as a single portion. Ideally, the coating reservoir of the applicator is also adapted for controlled heating. It is important that constant gentle agitation be provided in the mixing vessel and desirably in the reservoir. As little air as possible should be incorporated into the sauce. The chill tunnel is desirable albeit optional. An illustrative lemon butter sauce coating has the following composition:

| Ingredient | Percent by Weight |
| --- | --- |
| Durkee Dress-All base oil | 48.5% |
| Durkee Kaomel | 32.4% |
| Staley pregelatinized Dura-jel | 10.0% |
| Finely divided salt | 5.0% |

-continued

| Ingredient | Percent by Weight |
|---|---|
| Monosodium gluatmate | 1.5% |
| Powdered sugar (6×) | 1.2% |
| Parsley flakes | 0.5% |
| Commercial lemon flavors | 0.5% |
| Commercial milk flavors | 0.3% |
| Decolorized oleoresin black pepper | 0.1% |
| b-Carotene (30% in oil) | 0.005% |

This composition has the desired characteristics mentioned above and enables reduction in processing costs when applied to small portion units by apparatus such as shown diagrammatically in FIG. 1.

Other nonrandom triglyceride hard butters with melting profiles similar to Kaomel may be used in the enrobing sauce base of the present invention. Also, any lightly hydrogenated vegetable oil may be used as the oil component; however, the percent hard butter will need to be increased as the hydrogenation and room temperature solid content of the oil is decreased.

An additional example of a suitable partially hydrogenated vegetable oil would be a pourable margarine having consistency at 70° F., body temperature, and below freezing similar to Dress-All.

Because many of the frozen comestibles contain moisture, it is desirable to include in the formulation a moisture absorbing substance. For this purpose, a pregelatinized waxy-maize starch may be used. A particularly suitable example is Dura-jel (Trademark A. E. Staley Manufacturing Company) a precooked waxy-maize starch in which the water has been evaporated to yield a dry hygroscopic material which is bland in flavor. Dura-jel contains about 5% moisture. Other suitable starches include pregelatinized tapioca starch, pregelatinized corn starch, precooked tapioca, and precooked potato starches. Other suitable moisture absorbing substances include microcrystalline cellulose, proteins such as soy protein isolate, sodium alginate, soy albumen, gums such as carboxy methyl cellulose or methyl cellulose, whey protein, hydrolyzed vegetable protein, finely divided bread crumbs, cracker crumbs, and related bakery materials.

It is important that the moisture absorbing substance be uniformly dispersed in the oil to prevent clumping of the same particularly when applied to the surface of the frozen comestible. This can be accomplished by ordinary mixing and blending techniques and apparatus. Generally, the moisture absorbing materials should be fine particulates or powders not larger than 30 mesh and usually −325 mesh. Bread crumbs may vary in size over a much larger range of sizes up to the large Japanese style crum depending on the desired flavor, texture and appearance effects.

Soybean protein isolate can be incorporated into the sauce in the amount of about 3% by weight and result in an improved solid suspension and increased opacity.

Also by utilizing Santone 8-1-0 (a polyglycerol ester, octaglyceryl monostearate) in amounts ranging from 0.5% to 1.0% total weight basis, up to 10% of the fat can be replaced with water and/or other predominantly aqueous substances, e.g., vinegar, wine, fruit juice, etc., thus virtually eliminating any greasy mouthfeel. Also, a portion up to about half of the pregelatinized starch can be replaced by cook-up or heat swellable starch that is suitably freeze-thaw stable. In some instances a greasy mouthfeel is desired as in the case of lobster in butter sauce. Various other ingredients may be included to achieve desired effects, e.g., various milk solids for flavor and body, powdered seasonings and spices may be added to achieve various flavor and texture effects.

Although the present invention has been illustrated with frozen fish, the compositions of the present invention may be applied to other frozen comestibles such as frozen meat, e.g., frozen meat steaks with bernaise sauce coating, frozen chicken breasts with herb butter sauce coating, frozen onion rings with butter sauce coating, frozen aspargus spears with hollandaise sauce coating, and the like. The flavoring and coloring components of the present composition are all standard materials and may be used as desired. Where the moisture content of the frozen material being coated is substantial upon thawing, it is desirable to include a hygroscopic water absorbing material to preserve the integrity of the coating.

There has thus been provided an acceptable sauce for enrobing frozen comestible portions which can be made from a mixture of fats, oil soluble flavors, and various dry solids. The formulations given above are organoleptically acceptable. A mixture of 60% hydrogenated vegetable oil and 40% hard butter has a solid fat index which is very close to that of butter fat at body temperature and hardens rapidly when exposed to frozen foods surfaces. Conventional coating equipment can be slightly modified to produce for example, frozen fish in a lemon-butter sauce having a formulation as given above.

What is claimed is:

1. A sauce coating base for liquid phase application to a frozen comestible, a coating formed therefrom being characterized by resistance to cracking at frozen food temperatures, comprising
   (a) from 35 to 45 parts by weight of a nonrandom triglyceride hard butter consisting essentially of acids of 16 and 18 carbons distributed in the following ranges:

|  | Percent by Weight |
|---|---|
| Saturated fatty acids | 25–55 |
| Trans monoethanoic acids | 30–50 |
| Cis monoethanoic acids | 15–40 | and
   (b) from 55–65 parts by weight of a partially hydrogenated edible vegetable oil said edible oil having an Iodine Value of about 97–102, components (a) and (b) totalling 100 parts by weight.

2. A sauce coating base as defined in claim 1 wherein the edible hygroscopic material is a pregelatinized starch.

3. A sauce coating base as defined in claim 2 wherein the pregelatinized starch is a pregelatinized waxy-maize starch.

4. A sauce comprising a sauce coating base as defined in any of claims 1, 2, or 3 and at least one oil soluble flavor.

5. A sauce composition for liquid phase application to a frozen comestible to provide a coating on said comestible characterized by resistance to cracking at frozen food temperatures consisting essentially of:
   (a) a nonrandom triglyceride hard butter consisting essentially of acids of 16 and 18 carbons distributed in the following ranges:

| | Percent by Weight |
|---|---|
| Saturated fatty acids | 25-55 |
| Trans monoethanoic acids | 30-50 |
| Cis monoethanoic acids | 15-40, |

(b) a partially hydrogenated edible vegetable oil containing from 2% to 5% by weight of said oil of stearine, said oil having an Iodine Value of 97 to 102, components (a) and (b) being present in a weight ratio of about 2:3 and totalling about 81% of said sauce by weight, (c) about 10% by weight of said sauce of a pregelatinized starch, (d) about 5% by weight of salt, (e) about 1.5% by weight of monosodium glutamate, and (f) balance flavoring and color.

6. The method of enrobing a frozen comestible which comprises the steps of freezing the comestible to a temperature of from about 0° to about 10° F. and applying a liquid sauce thereto, said sauce being at a temperature of from about 95° F. to 110° F. and characterized by a coating base comprising:

(a) from 35 to 45 parts by weight of a nonrandom triglyceride hard butter consisting essentially of acids of 16 and 18 carbons distributed in the following ranges:

| | Percent by Weight |
|---|---|
| Saturated fatty acids | 25-55 |
| Trans-monoethanoic acids | 30-50 |
| Cis-monoethanoic acids | 15-40 | and (b) from 55-65 parts by weight of a partially hydrogenated edible vegetable oil said edible oil having an Iodine Value of about 97-102, components (a) and (b) totalling 100 parts by weight.

7. A frozen comestible having a sauce coating thereon, said coating containing a coating base comprising:

(a) from 35 to 45 parts by weight of a nonrandom triglyceride hard butter consisting essentially of acids of 16 and 18 carbons distributed in the following ranges:

| | Percent by Weight |
|---|---|
| Saturated fatty acids | 25-55 |
| Trans-monoethanoic acids | 30-50 |
| Cis-monoethanoic acids | 15-40 | and (b) from 55-65 parts by weight of a partially hydrogenated edible vegetable oil said edible oil having an Iodine Value of about 97-102, components (a) and (b) totalling 100 parts by weight.

8. A frozen comestible in accordance with claim 7 in which the comestible is seafood.

9. A frozen comestible in accordance with claim 7 in which the comestible is vegetable.

10. A frozen comestible in accordance with claim 7 in which the comestible is meat.

11. A frozen comestible in accordance with claim 7 in which the frozen comestible is poultry.

* * * * *